United States Patent
Ito

(10) Patent No.: US 6,260,993 B1
(45) Date of Patent: *Jul. 17, 2001

(54) VEHICLE LAMP

(75) Inventor: Makoto Ito, Shizuoka (JP)

(73) Assignee: Koito Manufacturing Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,597

(22) Filed: Oct. 19, 1998

(30) Foreign Application Priority Data

Oct. 20, 1997 (JP) .................................................. 9-304835

(51) Int. Cl.⁷ ................................................ F21V 7/00
(52) U.S. Cl. ............................ 362/514; 362/529; 362/531; 362/532; 362/273; 362/275
(58) Field of Search ........................... 362/514, 515, 362/529, 530, 531, 532, 273, 275, 461

(56) References Cited

U.S. PATENT DOCUMENTS

| 4,503,486 | 3/1985 | Makita ................................ 362/61 |
| 4,831,502 | 5/1989 | Fujino et al. ....................... 362/61 |
| 4,881,152 | 11/1989 | Watanabe et al. .................. 362/61 |
| 4,903,173 | 2/1990 | Mochizuki et al. ................ 362/66 |
| 5,083,244 | * 1/1992 | Shirai ................................ 362/461 |
| 5,337,223 | 8/1994 | Fujino ................................ 362/66 |
| 5,546,283 | 8/1996 | Ohtsuka et al. .................... 362/61 |

* cited by examiner

Primary Examiner—Darren Schuberg
Assistant Examiner—Fayez Assaf
(74) Attorney, Agent, or Firm—Morgan, Lewis & Bockius LLP

(57) ABSTRACT

A vehicle lamp includes: a reflector having a rear surface and an aiming screw coupling portion; a lamp body having an inner surface, for containing the reflector tiltably; an aiming screw extending in a substantially longitudinal direction coupled to the aiming screw coupling portion of the reflector and the lamp body; a first projected portion formed near the aiming screw coupling portion on the rear surface of the reflector; and a second projected portion formed on the inner surface of the lamp body in a place behind the first projected portion. When the reflector is tilted up to a predetermined angle position, the first and second projected portions are brought into contact with each other within a plane substantially perpendicular to the axial direction of the aiming screw.

8 Claims, 6 Drawing Sheets

VEHICLE LAMP

BACKGROUND OF THE INVENTION

The present invention relates to a vehicle lamp furnished with a moving-reflector type aiming mechanism.

Vehicle lamps such as head lamps and fog lamp are generally provided with aiming mechanisms for adjusting directions of irradiation and in the case of a vehicle lamp having a reflector contained in a lamp body, a moving-reflector type aiming mechanism is employed.

Such a moving-reflector type aiming mechanism so configured that aiming screws are used to couple a tiltable reflector and a lamp body for containing the reflector functions is what tilts the reflector in a predetermined direction by turning the aiming screws in order to make an aiming adjustment.

However, the vehicle lamp equipped with the aforesaid moving-reflector type aiming structure has the following problem:

If the reflector is tilted more than necessary over a proper tilting angle position, the leading edge portion of the aforesaid aiming screw will be brought into contact with the rear surface of the reflector at a certain tilted angle. If the aiming screw is turned further, there will develop problems arising from defects such as cracks, crazing, bends and the like caused by the load of the aiming screw to the reflector.

When it is attempted to secure a large reflective area in a small-sized lamp in particular, the difficulty of providing a sufficient allowance in the direction of inclination results in developing the defects since the reflector and the lamp body are situated close to each other before the reflector is brought into contact with the aiming screw after exceeding the proper tilting angle position.

SUMMARY OF THE INVENTION

An object of the present invention is to provide a vehicle lamp so adapted as to prevent development of defects on a reflector because of excessive inclination.

Means for Solving the Problems

According to the present invention, a vehicle lamp comprising a reflector, a lamp body for containing the reflector tiltably and aiming screws coupled to the reflector and the lamp body and extended in a substantially longitudinal direction is characterized in that a first projected portion is formed in a place near an aiming screw coupling portion on the rear surface of the reflector and a second projected portion is formed in a place behind the first projected portion with respect to the inner surface of the lamp body and that when the reflector is tilted up to a predetermined angle position, the first and second projected portions are brought into contact with each other within a plane substantially perpendicular to the axial direction of the aiming screw.

The aforesaid tilting direction is not restrictive but may be any vertical, horizontal or oblique direction.

The aforesaid "first and second projected portions" are not limited to a specific arrangement on condition that the first and second projected portions can be brought into contact with each other within a plane substantially perpendicular to the axial direction of the respective aiming screws and may be in the form of ribs, those formed by rendering the rear surface of the reflector and the inner surface of the lamp body partially planar or the like.

The aforesaid "place near an aiming screw coupling portion on the rear surface of the reflector" means a place within a one-third distance of the length of a line connecting the axial line position and the fulcrum position of the tilting reflector from the axial line position of the aiming screw.

The aforesaid "predetermined angle position" is such that as long as the leading edge portion of the aiming screw is positioned at an angle of inclination smaller than the angle of inclination at which the aiming screw is brought into contact with the rear surface of the reflector, the degree of the angle of inclination is not specifically restricted.

Functions and Effect of the Invention

As shown in the arrangement of the vehicle lamp according to the present invention, the leading edge portion of the aiming screw is prevented from being brought into contact with the rear surface of the reflector since the first projected portion formed in the place near the aiming screw coupling portion on the rear surface of the reflector and the second projected portion formed in the place behind the first projected portion on the inner surface of the lamp body are brought into contact with each other when the reflector is tilted up to the predetermined angle position. Since the first and second projected portions are brought into contact with each other within the plane substantially perpendicular to the axial direction of the aiming screw at that time, the reflector can be prevented from being excessively overloaded thereby.

According to the present invention, development of defects such as cracks, crazing, bends and the like caused by the excessive inclination of the reflector can be prevented accordingly.

Thus, thermoplastic resins excellent in forming workability and dimensional stability though comparatively inferior in rigidity may be used as material for the reflector above.

With the aforesaid arrangement, "the first projected portion" may be formed independently of the aiming screw coupling portion as long as it is formed in the place near the aiming screw coupling portion on the rear surface of the reflector or may be formed in a fashion contiuous to the aiming screw coupling portion. However, according to the present invention, since the first projected portion and the aiming screw coupling portion are capable of reinforcing each other in the latter case, an excessive load is prevented from acting on the reflector more effectively when the first and second projected portions are brought into contact with each other.

With the aforesaid arrangement, moreover, according to the present invention, the first and second projected portions are formed in the shape of ribs extending within planes substantially perpendicular to each other to ensure that both the projected portions can be brought into contact with each other even though some fabrication error and the like are produced between the reflector and the lamp body.

In this case, according to the present invention, the formation of a reinforcing portion in the intermediate region of the first projected portion eliminates the possibility of letting the projected portion from fall down because the projected portion is formed like a rib. At this time, the formation of the boss-like "reinforcing portion" makes it possible to utilize the reinforcing portion as a projected pin receiving portion at the time of molding the reflector.

In this case, according to the present invention, furthermore, the formation of a reinforcing rib extending in a direction substantially perpendicular to the second projected portion on both sides portions of the second projected portion eliminates the possibility of letting the second projected portion fall down.

DETAILED DESCRIPTION OF THE PREFERRED EMBODIMENTS

A mode for carrying out the invention will subsequently be described with reference to the drawings.

Figure 1:
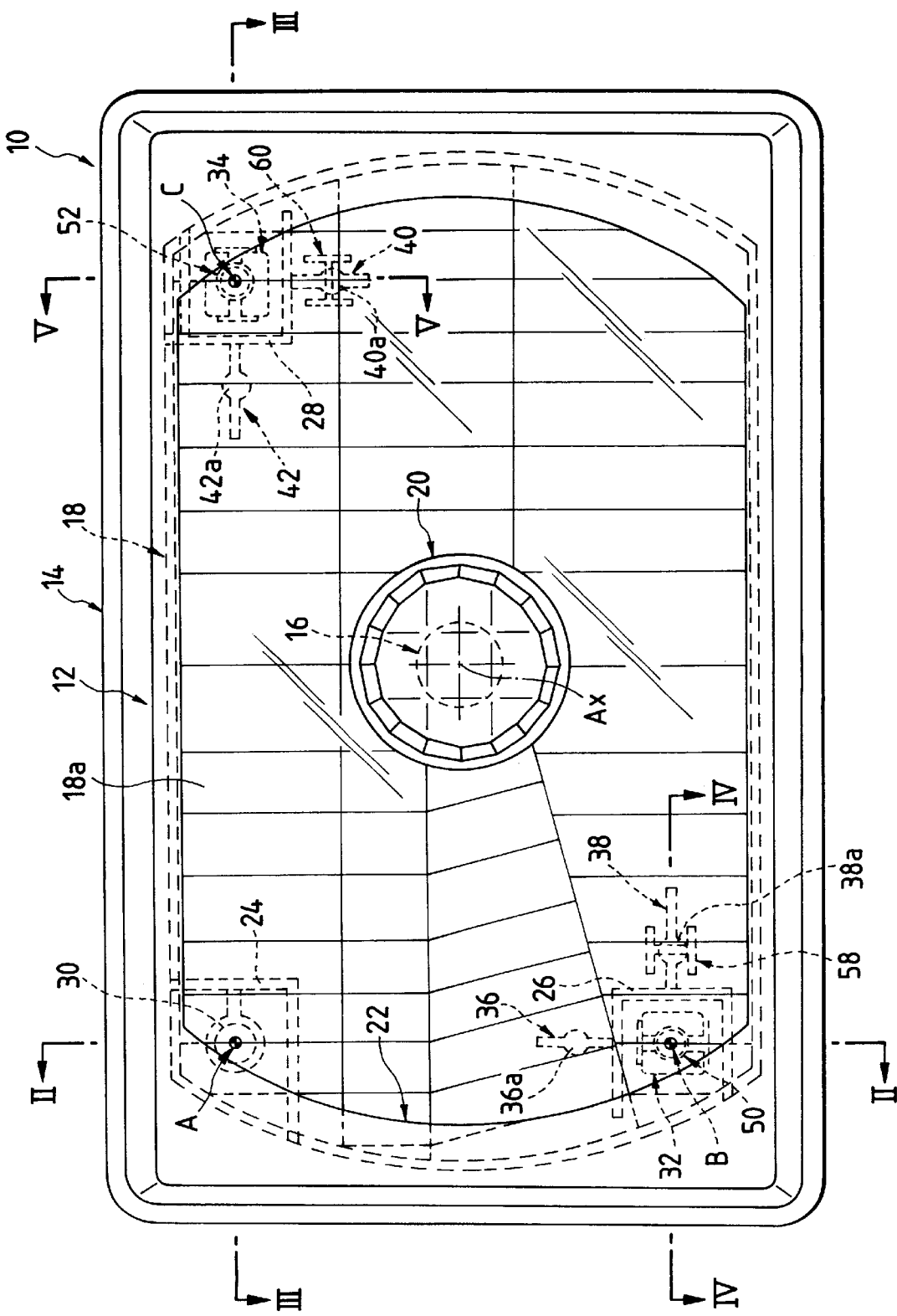
FIG. 1 is an elevational view of a vehicle lamp embodying the present invention.
Figure 2:
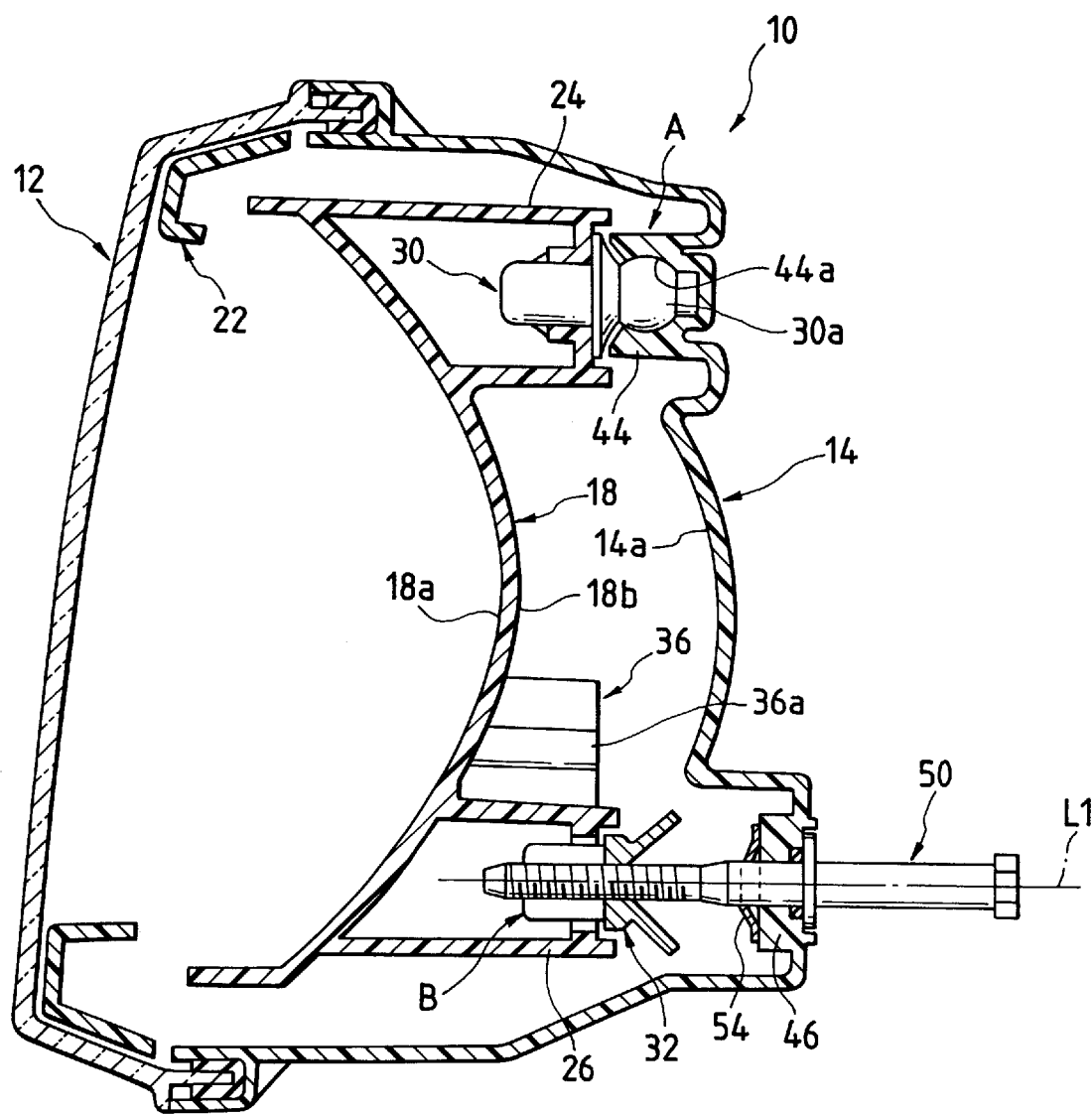
FIG. 2 is a sectional view taken on line II—II.
Figure 3:
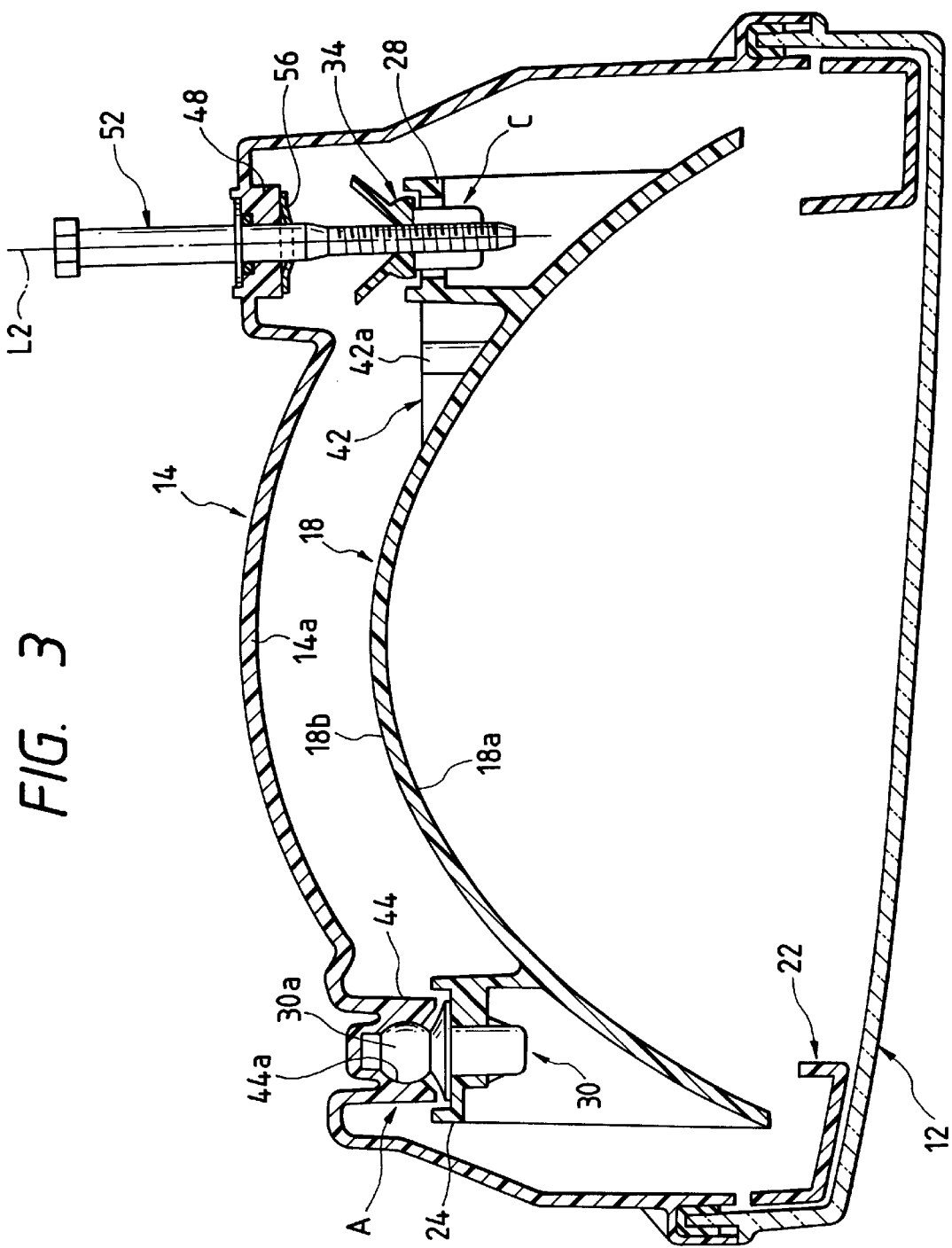
FIG. 3 is a sectional view taken on line III—III.

FIG. 1 is an elevational view of a vehicle lamp embodying the present invention. FIGS. 2, 3, 4 and 5 are sectional views taken on lines II—II, III—III, IV—IV and V—V of FIG. 1, respectively.

As shown in these drawings, a vehicle lamp 10 is a head lamp having a moving-reflector type aiming mechanism and a reflector 18 mounted with a light source bulb 16 is contained in a space formed with a lens 12 and a lamp body 14 in such a manner that the reflector 18 is made tiltable vertically and horizontally. The lamp body 14 and the reflector 18 are injection-molded articles made of thermoplastic resin and the reflective surface 18a of the reflector 18 is formed of a plurality of reflective surface elements. In this case, a shade 20 is provided in a place near the front of the light source bulb 16 and an extension 22 is provided near the peripheral edge portion of the reflector 18.

In FIG. 1, a point A in the upper left position of an optical axis Ax (on the upper left side in the elevational view of the lamp) is of an aiming fulcrum; a point B in the lower left position of the optical axis Ax is a vertical point of aiming application; and a point C in the upper right position of the optical axis Ax is a horizontal point of aiming application.

Brackets 24, 26, 28 are formed integrally with the reflector 18 in places corresponding to the respective points A, B, C on the rear surface 18b of the reflector 18. Each of the brackets 24, 26, 28 is U-shaped in cross section. A fulcrum pin 30 is fixedly fitted in the leading edge portion of the bracket 24, whereas self-locking nuts 32, 34 are fitted in and mounted on the respective leading edge portions of the brackets 26, 28 (aiming screw coupling portions).

The bracket 26 is formed with a vertical rib 36 extending vertically and a horizontal rib 38 (a first projected portion) extending to the right and the bracket 28 is formed with a vertical rib 40 (a first projected portion) extending downward and a horizontal rib 42 extending to the left. Boss-like reinforcing portions 36a, 40a and 38a, 42a are formed in the intermediate regions of the vertical ribs 36, 40 and the horizontal ribs 38, 42, respectively.

Figure 6:
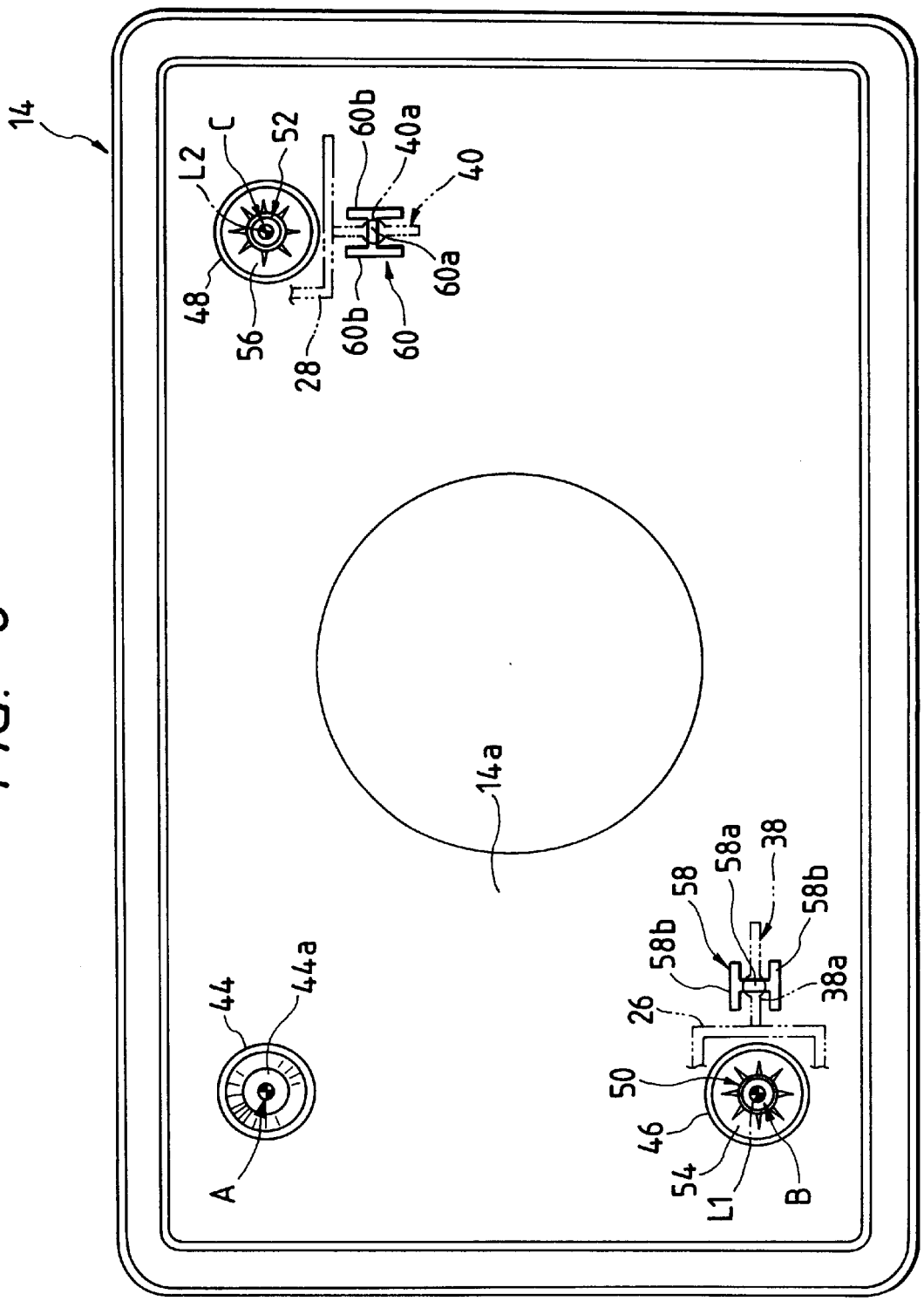
FIG. 6 is elevational view of the lamp body of the lamp.
Figure 7:
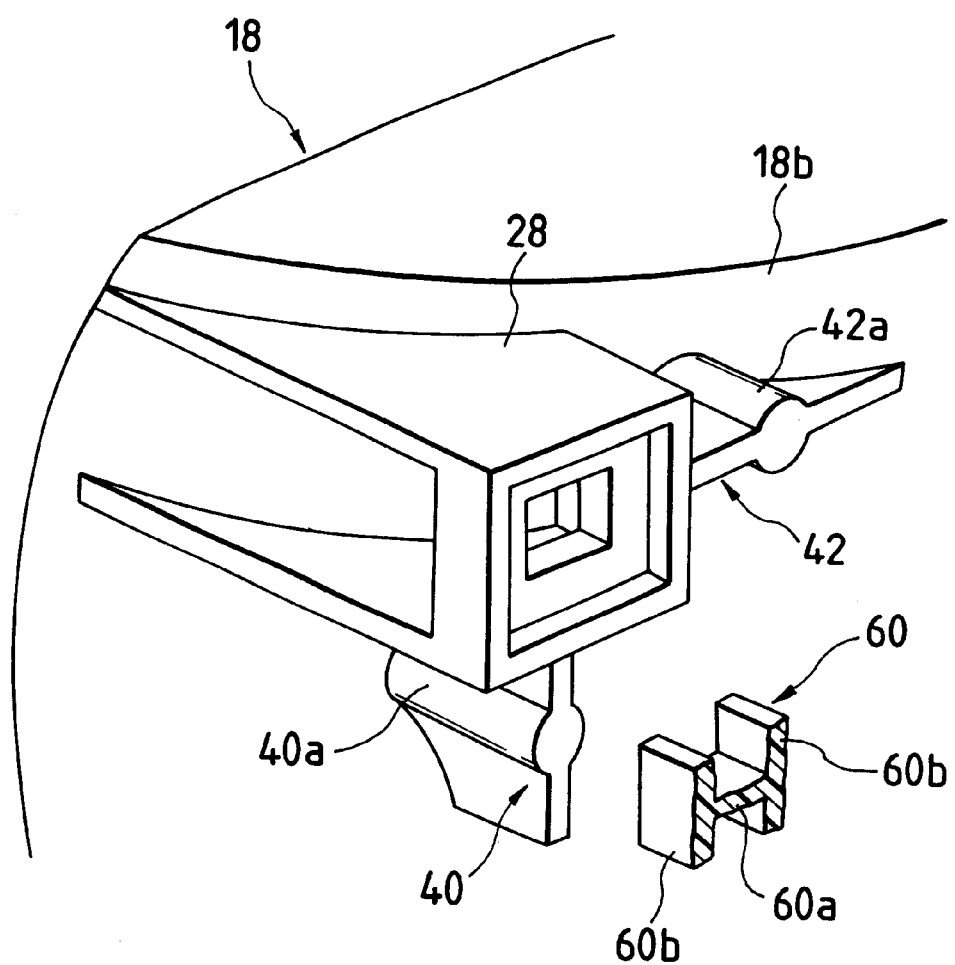
FIG. 7 is a perspective view of the principal part of the lamp.

FIG. 6 is an elevational view of the lamp body 14.

As shown in FIG. 6, a boss 44 is formed in the position of the point A on the inner surface 14a of the lamp body 14 and a support hole 44a engaging with the spherical leading end portion 30a of the fulcrum pin 30 is formed in the boss 44. Furthermore, bosses 46, 48 are formed in the respective positions B, C on the inner surface 14a of the lamp body 14 and aiming screws 50, 52 are provided in the respective bosses 46, 48 in such a fashion as to pass therethrough longitudinally. These aiming screws 50, 52 are rotatably supported by push-on fixed supports 54, 56 around axes L1, L2 longitudinally extending with respect to the lamp body 14, respectively.

A H-shaped rib 58 is formed in a place near the right side of the boss 46 on the inner surface 14a of the lamp body 14, whereas a H-shaped rib 60 is formed in a place near the lower side of the boss 48. The H-shaped rib 58 is essentially constituted of a vertical rib 58a (a second projected portion) and a pair of horizontal ribs 58b (reinforcing ribs) on both respective sides of the vertical rib 58a, whereas the H-shaped rib 60 is essentially constituted of a horizontal rib 60a (a second projected portion) and a pair of vertical ribs 60b (reinforcing ribs) on both respective sides of the horizontal rib 60a.

In the lamp 10, a vertical aiming adjustment is made by tilting the reflector 18 around a horizontal axis connecting the points A and C by turning the aiming screw 50, whereas a horizontal aiming adjustment is made by tilting the reflector 18 around a vertical axis connecting the points A and B by turning the aiming screw 52.

Figure 4:
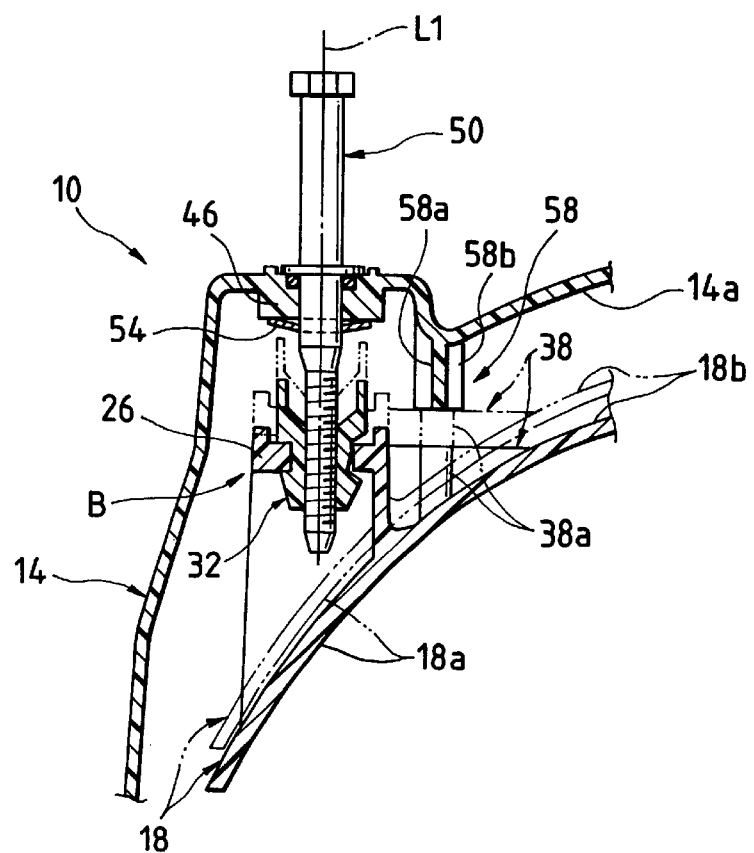
FIG. 4 is a sectional view taken on line IV—IV.

When the reflector 18 is excessively tilted downward then as shown by a chain double-dashed line of FIG. 4, the leading edge face of the horizontal rib 38 formed on the rear surface 18b of the reflector 18 is brought into contact with the front edge face of the vertical rib 58a of the H-shaped rib 58, whereby the leading edge portion of the aiming screw 50 is prevented from being brought into contact with the rear surface 18b of the reflector 18. The horizontal rib 38 and the vertical rib 58a are brought into contact with each other within a plane substantially perpendicular to the axial direction L1 of the aiming screw 50. Moreover, the reinforcing portion 38a of the horizontal rib 38 is brought into contact with the vertical rib 58a.

Figure 5:
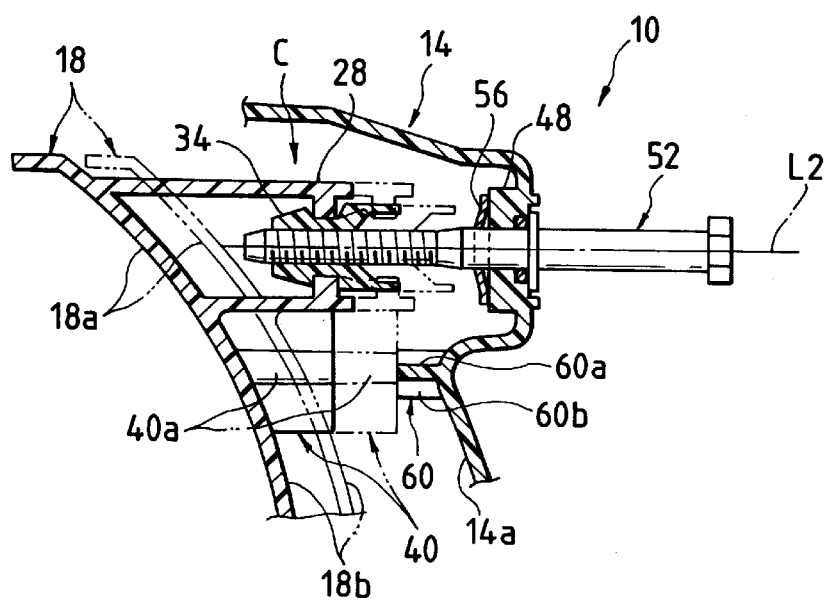
FIG. 5 is a sectional view taken on line V—V.

As shown by a chain double-dashed line of FIG. 5, furthermore, the leading edge face of the vertical rib 40 formed on the rear surface 18b of the reflector 18 is brought into contact with the leading edge face of the horizontal rib 60a of the H-shaped rib 60 when the reflector 18 is excessively tilted leftward (on the left toward the front of the vehicle body), whereby the leading edge portion of the aiming screw 52 is prevented from being brought into contact with the rear surface 18b of the reflector 18. The vertical rib 40 and the horizontal rib 60a are brought into contact with each other within a plane substantially perpendicular to the axial direction L2 of the aiming screw 52. The reinforcing portion 40a of the vertical rib 40 is brought into contact with the horizontal rib 60a.

As set forth above in detail, the leading edge face of the horizontal rib 38 or the vertical rib 40 formed in a place near the bracket 26 or 28 for coupling the aiming screw on the rear surface 18b of the reflector 18 is so arranged as to be brought into contact with the leading edge face of the vertical rib 58a or the horizontal rib 60a formed in a place behind the horizontal rib 38 or the vertical rib 40 with respect to the inner surface 14a of the lamp body 14 when the reflector 18 of the vehicle lamp 10 according to this embodiment of the invention is tilted downward or leftward (i.e., in the direction in which the leading edge portion of the aiming screw 50 or 52 may be brought into contact with the rear surface 18b of the reflector 18) up to the predetermined angle position, whereby the leading edge portion of the aiming screw 50 can be prevented from being brought into contact with the rear surface 18b of the reflector 18.

Since the horizontal rib 38 is brought into contact with the vertical rib 58a or otherwise the vertical rib 40 is brought into contact with the horizontal rib 60a within the plane substantially perpendicular to the axial directions L1, L2 of the aiming screw 50, the reflector 18 is prevented from being excessively overloaded when the aforesaid ribs are brought into contact with each other.

According to this embodiment of the invention, development of defects such as cracks, crazing, bends and the like caused by the excessive inclination of the reflector can be prevented accordingly.

Since the horizontal rib 38 and the bracket 26 are formed in a fashion continuous to each other according to this embodiment of the invention, the horizontal rib 38 and the bracket 26 are capable of reinforcing each other and since the vertical rib 40 and the bracket 28 are formed in a fashion continuous to each other, the vertical rib 40 and the bracket 28 are capable of reinforcing each other. Therefore, an excessive load is prevented from acting on the reflector 18 more effectively when the horizontal rib 38 and the vertical rib 58a are brought into contact with each other or when the vertical rib 40 and the horizontal rib 60a are brought into contact with each other.

According to this embodiment of the invention, furthermore, the horizontal rib 38 and the vertical rib 58a and the vertical rib 40 and the horizontal rib 60a are respectively extended within the planes substantially perpendicular to each other to ensure that both the ribs can be brought into contact with each other even though some fabrication error and the like are produced between the reflector 18 and the lamp body 14.

According to this embodiment of the invention, furthermore, the formation of the reinforcing portions 38a, 40a in the respective intermediate regions of the horizontal rib 38 and the vertical rib 40 eliminates the possibility of letting the horizontal rib 38 and the vertical rib 40 fall down. Since each of the reinforcing portions 38a, 40a is formed like a boss moreover, the boss may be utilized as an ejection-pin receiving portion at the time of injection-molding the reflector 18. Since the horizontal rib 38 and the vertical rib 58a or the vertical rib 40 and the horizontal rib 60a are brought into contact with each other in a place where the reinforcing portions 38a, 40a are formed, the deformation of the contact area is reduced by securing a wide rib contact area.

According to this embodiment of the invention, furthermore, the brackets 26, 28 are respectively formed with the vertical rib 36 and the horizontal rib 42 which are similar to the horizontal rib 38 and the vertical rib 40, including the boss-like reinforcing portions 36a, 42a provided on the vertical rib 36 and the horizontal rib 42, such that the strength of the brackets 26, 28 is improved.

According to this embodiment of the invention, furthermore, each of the vertical and horizontal ribs 58a, 60a is formed as part of each of the H-shaped ribs 58, 60, and the pair of horizontal ribs 58b and the pair of vertical ribs 60b as reinforcing portions are extended and formed on both sides of the vertical rib 58a and both sides of the horizontal rib 60a so as to eliminate the possibility of letting the vertical rib 58a and the horizontal rib 60a fall down.

What is claimed is:

1. A vehicle lamp comprising:
    a reflector having a rear surface and an aiming screw coupling portion;
    a lamp body having an inner surface, for containing the reflector tiltably;
    an aiming screw extending in a substantially longitudinal direction coupled to the aiming screw coupling portion of the reflector and the lamp body;
    a first projected portion formed near the aiming screw coupling portion on the rear surface of the reflector; and
    a second projected portion formed on the inner surface of the lamp body in a place behind the first projected portion, wherein the vehicle lamp is configured such that, after assembly of the vehicle lamp, when the reflector is tilted from an initial position where the first and second projected portions are separated from each other up to a predetermined angle position, the first and second projected portions are brought into contact with each other within a plane substantially perpendicular to the axial direction of the aiming screw.

2. The vehicle lamp as claimed in claim 1, wherein the first projected portion is continuously formed with the aiming screw coupling portion.

3. The vehicle lamp as claimed in claim 1, wherein the first and second projected portions have ribs extending within planes substantially perpendicular to each other.

4. The vehicle lamp as claimed in claim 3, wherein the first projected portion has a reinforcing portion at the rib thereof.

5. The vehicle lamp as claimed in claim 3, wherein a reinforcing portion extending in a direction substantially perpendicular to the second projected portion formed on both sides the rib of the second projected portion.

6. A vehicle lamp comprising:
    a reflector having a rear surface;
    a lamp body having an inner surface, for containing the reflector tiltably;
    a vertical aiming screw coupling portion having a first projected portion horizontally extending, formed on the rear surface of the reflector;
    a vertical aiming screw extending in a substantially longitudinal direction coupled to the vertical aiming screw coupling portion of the reflector and the lamp body;
    a second projected portion vertically extending on the inner surface of the lamp body in a place behind the first projected portion of the vertical aiming screw coupling portion, wherein the vehicle lamp is configured such that, after assembly of the vehicle lamp, when the reflector is tilted from an initial position where the first and second projected portions are separated from each other up to a predetermined angle position, the first and second vertical projected portions are brought into contact with each other;
    a horizontal aiming screw coupling portion having a third projected portion vertically extending, formed on the rear surface of the reflector;
    a horizontal aiming screw extending in a substantially longitudinal direction coupled to the horizontal screw aiming coupling portion of the reflector and the lamp body; and
    a fourth projected portion horizontally extending on the inner surface of the lamp body in a place behind the third projected portion of the horizontal aiming screw coupling portion, wherein, after assembly of the vehicle lamp, when the reflector is tilted up to a predetermined angle position, the third and fourth projected portions are brought into contact with each other.

7. The vehicle lamp according to claim 6, wherein the vertical aiming screw coupling portion having a portion horizontally extending therefrom, and the horizontal aiming screw coupling portion having a portion vertically extending therefrom.

8. The vehicle lamp according to claim 6, wherein each of the second and fourth projected portions has an H-shape.

* * * * *